Nov. 1, 1932.    P. P. BOGLEY    1,885,325
BROILER PLATE
Filed May 19, 1931

Inventor
PRESTON PEARCE BOGLEY

By J. B. Dickman, Jr.
Attorney

Patented Nov. 1, 1932

1,885,325

UNITED STATES PATENT OFFICE

PRESTON PEARCE BOGLEY, OF CHICAGO, ILLINOIS

BROILER PLATE

Application filed May 19, 1931. Serial No. 538,587.

This invention appertains to broilers and more particularly to broilers adapted to be used in combination with cooking utensils, and especially cooking utensils of the frying pan type.

One of the primary objects of my invention is to provide a broiler of unitary structure which can be manufactured of any suitable metal and placed upon the market at a reasonable cost.

Another important object of my invention is the provision of a broiler of unitary structure, adapted to be used in combination with cooking utensils such as frying pans.

A still further salient feature of my invention is the provision of a broiler of unitary structure having corrugations which are provided with elliptical openings at their apices.

A further salient feature of my invention is the provision of a broiler of unitary structure having troughs interposed between the corrugations, the troughs forming part of the base and being provided with elongated apertures.

Another important object of my invention is the provision of a broiler of unitary structure that is easily washed with the expenditure of a minimum amount of effort.

With these and other objects in view, the invention consists in the novel construction and formation of parts as will be hereinafter more specifically described, claimed and illustrated in the accompanying drawing, in which drawing:—

Figure 1:
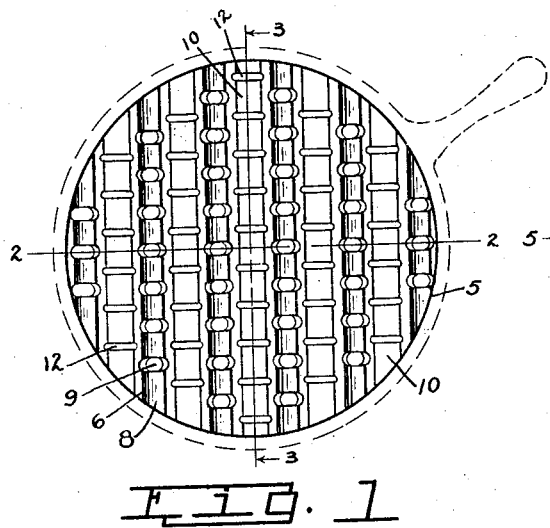
Figure 1, is a top plan view of my broiler.

Referring to the drawing 5 represents a broiler plate of circular configuration adapted for use with a frying pan shown in dotted lines in the drawing. The broiler plate may be constructed of any suitable metal, preferably aluminum. The surface of the plate has a plurality of corrugations 6, the bottom face 7 of the outer side walls of the end corrugations acting as a base. The apices 8 of the corrugations are rounded, providing a uniform surface for the meat to be placed upon and during the cooking operation, the meat is turned with a minimum amount of effort. The corrugations 6 are provided with a plurality of elliptical openings 9, the openings being in the apices of the corrugations and extending downwardly in said wall of the corrugations approximately midway the apex and base. The elliptical openings have a two-fold purpose, first they allow the heat to reach the meat and second during the broiling operation they allow the juices exuded from the meat to drip through and into the pan. The intervening spaces between the corrugations are flat forming troughs 10, and it is to be noted that the lower faces 11 of the troughs contact the cooking face of the pan and form a base for the plate in conjunction with the bottom face of the outer side walls of the end corrugations. The lower faces of the troughs by forming a base for the plate, provide a reinforced structure which prevents the plate from warping or buckling from constant use. The troughs 10 are provided with a plurality of elongated openings 12 which allow a portion of the heat to rise upwardly through the base. As shown in the drawing the openings are in spaced relation to the elliptical openings 9 in the corrugations.

Figure 4:
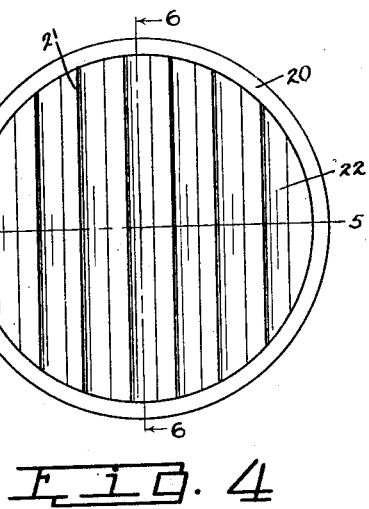
Figure 4, is a top plan view of a modified form of my invention.
Figure 2:
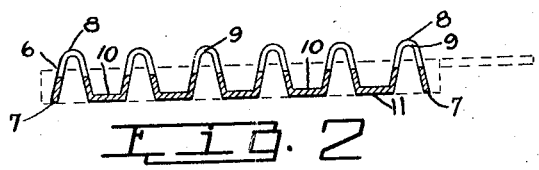
Figure 2, is a sectional view taken on line 2—2 of Figure 1.
Figure 5:
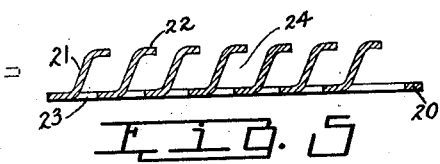
Figure 5, is a sectional view taken on line 5—5 of Figure 4, showing the upstanding fins.
Figure 3:
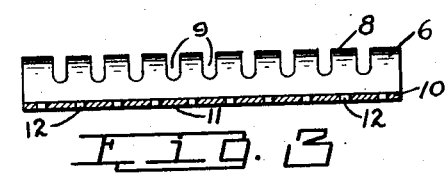
Figure 3, is a transverse sectional view taken on line 3—3 of Figure 1, looking in the direction of the arrows.
Figure 6:
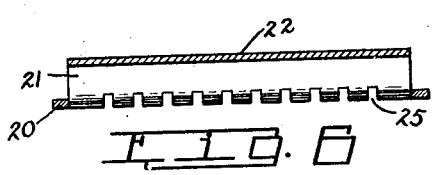
Figure 6, is a transverse sectional view taken on line 6—6 of Figure 4, looking in the direction of the arrows.

My invention is capable of modification and in Figures 4 to 6 inclusive I have shown another form of my invention in which fins are shown issuing out of the base.

Referring to Figures 4 to 6 more specifically it can be seen that I provide a broiler plate of unitary structure comprising an annular flange 20 forming a base for the plate. The surface within the inner peripheral edge of the annular flange 20 is formed into a plurality of fins 21, the base of the fins at their ends being integral with the annular base. It is to be noted that the lower plane surface of the fins are on a plan with the lower plane face of the annular flange for intimate contact with the cooking face of the utensil.

The walls of the fins are disposed at an angle to the base, the upper ends 22 of the fins being bent at substantially right angles to the fin walls. The ends 22 being bent in the manner shown form the broiling surface and a substantially flat top for the meat. The fins 21 are in spaced relation to each other and between the fins in the base heat escape openings 23 are provided. These openings 23 allow the heat to radiate through the base and on up through the spaced openings 24 between the fins, direct to the meat. In the side walls of the fins near the base, a plurality of openings 25 are formed allowing the exuded juices to run in a lateral direction. The spaces between the fins allow the juices exuded from the meat during the broiling process to drip down into the pan.

From the foregoing description it can be seen that I provide a broiler plate to be used in combination with cooking utensils of the frying pan type, one that is of unitary structure, easy to clean and capable of being manufactured at a minimum cost.

Changes in details may be made without departing from the spirit or the scope of this invention, and what I claim is:—

1. In combination with a cooking utensil a broiler plate comprising an annular flanged base, fins issing out of said base, the walls of said fins being disposed at an angle to the base, and in spaced relation to each other, openings in the base between the fins to allow heat therethrough, said fins having apertures in the walls thereof near the base for the lateral flow of fluids, the upper ends of the fins being bent forming a top.

2. A broiler plate for cooking utensils, comprising a unit consisting of an annular flanged base, fins, heat escape openings in the base, openings between the fins, a plurality of apertures in the walls of the fins, the upper ends of the fins being bent forming a top.

3. A broiler plate for use in conjunction with conventional cooking utensils comprising a body formed from a single sheet of metal, having a plurality of equi-distantly spaced corrugations extending entirely across the plate, the upper faces of the corrugations being provided with equi-distantly spaced outlet openings, the bases of the corrugations being flattened to form a flat contact face for engaging the cooking utensil, said flat bases being provided with a series of heat escape openings arranged between the openings in the tops of the corrugations, whereby all of said corrugations will be staggerdly arranged.

4. A broiler plate for use in conjunction with conventional cooking utensils comprising a circular body formed from a single sheet of metal, a plurality of spaced parallel raised elongated food support projections extending entirely across the face of the plate, said projections increasing progressively in length toward the diametric center of the plate from the opposite sides of the plate, the body having heat escape openings both at the bottoms and the tops of said projections, the body with its projections having a flat smooth face for engagement with the utensil.

In testimony whereof, I affix my signature.

PRESTON PEARCE BOGLEY.